United States Patent [19]

Bush

[11] 4,256,318
[45] Mar. 17, 1981

[54] PISTON RING

[75] Inventor: Jerome J. Bush, Holland, Mich.

[73] Assignee: Sealed Power Corporation, Muskegon, Mich.

[21] Appl. No.: 144,676

[22] Filed: Apr. 28, 1980

[51] Int. Cl.³ .............................................. F16J 9/14
[52] U.S. Cl. ................................... 277/221; 277/224
[58] Field of Search ................................ 277/220–224

[56] References Cited

U.S. PATENT DOCUMENTS

| | | | |
|---|---|---|---|
| 1,392,536 | 10/1921 | Syfert | 277/223 |
| 2,962,332 | 11/1960 | Hale | 277/220 |
| 3,608,911 | 9/1971 | Prasse | 277/223 |
| 4,040,637 | 8/1977 | McCormick | 277/224 |
| 4,106,782 | 8/1978 | Hyde | 277/224 |
| 4,189,161 | 2/1980 | Grimm | 277/221 |

Primary Examiner—Robert I. Smith
Attorney, Agent, or Firm—Barnes, Kisselle, Raisch & Choate

[57] ABSTRACT

A parted annular piston ring having an outer periphery for engaging a cylinder wall of an internal combustion engine. A band of hard, wear-resistant material is secured in a groove which extends circumferentially completely around the outer periphery. The band is disposed axially between upper and lower narrow lands. An overlapping joint construction is provided at the parted ends of the ring and comprises mutually circumferentially overlappable surfaces inclined at an acute angle relative to the plane of the ring and terminating in the outer periphery of the ring along edges disposed in the upper land. The upper land is wider than the lower land, and the mutually overlappable joint surfaces terminate at their radially inward edges in the bottom side wall of the ring. The band has axial extending end edges exposed at the split, and the outer periphery of the ring has a barrel face contour such that the maximum outside diameter of the ring falls within the outer wear surface of the band.

9 Claims, 9 Drawing Figures

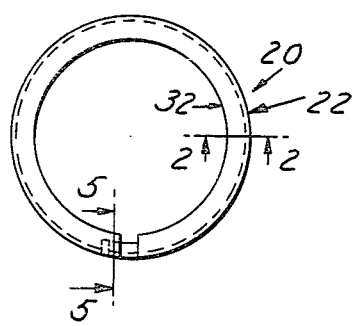
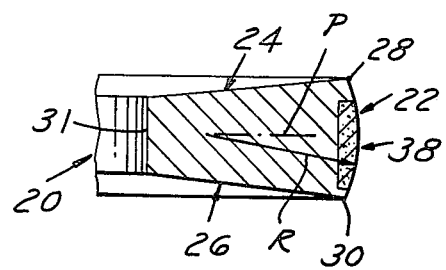
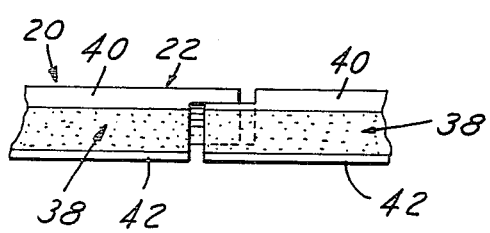
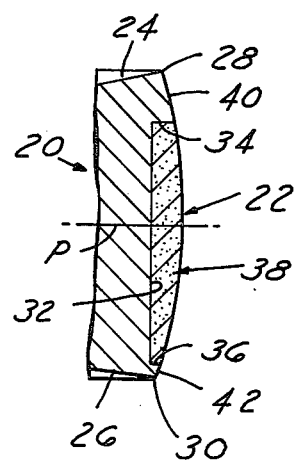
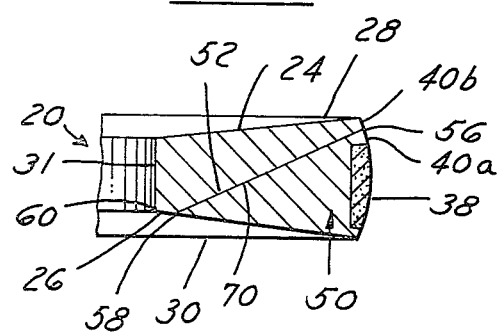

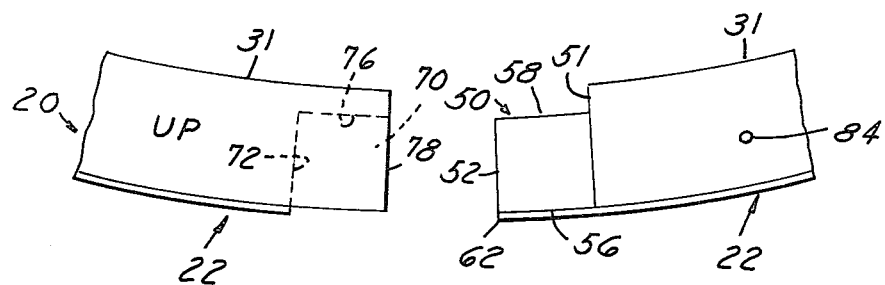
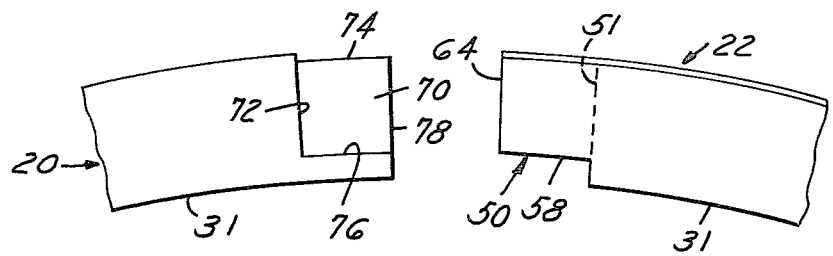
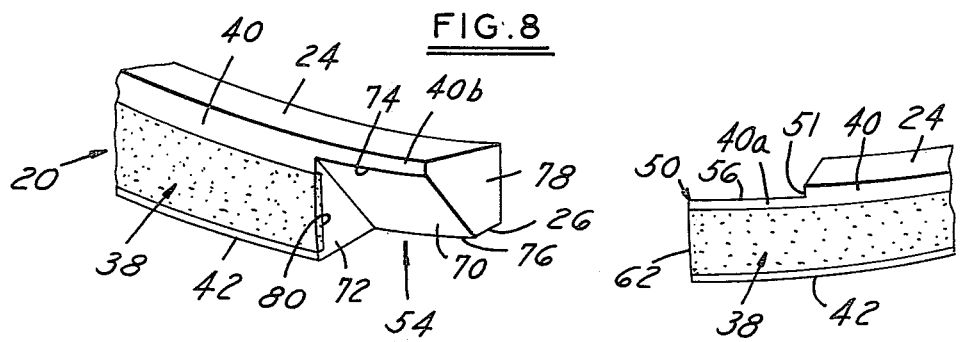
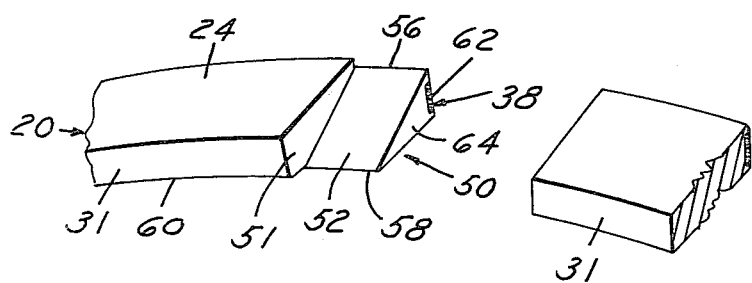

PISTON RING

The present invention relates to piston rings, and more particularly to a parted annular piston ring structure having a wear-resistant facing or coating on the ring bearing surface and an overlap-type sealing joint at the ring gap.

It has heretofore been recognized that parted annular rings having a wear coating on the outer radial surface may be advantageously employed as top or compression piston rings in a reciprocating piston internal combustion engine. Examples of such rings are disclosed in United States patents to Marien, U.S. Pat. No. 3,133,739 and Olson, U.S. Pat. No. 2,266,692. It has also been found desirable to provide overlapping joint designs at the ring gap in piston compression rings to obtain improved sealing at the ring gap with resultant reduction in so-called blow-by of combustion gases. Examples of such seal joint designs are shown in the U.S. patent to Raworth, U.S. Pat. No. 615,902. However, it has been found that the overlap-type gap joints previously proposed to provide effective sealing cannot be utilized with wear-coated rings of conventional design without potential chipping and damage to the wear coating in the joint area during ring manufacture. It has been proposed to leave the joint area uncoated, but this can result in ineffective sealing and damage to the engine.

Accordingly, it is an object of the present invention to provide an improved parted annular piston ring which combines the advantageous characteristics of wear-coated piston rings with the improved blow-by sealing characteristics of overlapping-type joint designs, and wherein the wear-coating extends completely circumferentially around the bearing surface of the ring.

Other objects, features and advantages of the invention will become apparent from the following detailed description taken in conjunction with the accompanying drawings wherein:

FIG. 1 is a top plan view of a piston ring constructed in accordance with the principles of the present invention;

FIG. 2 is a fragmentary vertical sectional view taken on the line 2—2 of FIG. 1;

FIG. 3 is a fragmentary view of a portion of the ring illustrated in FIG. 2 but enlarged thereover;

FIG. 4 is a fragmentary vertical elevational view looking in a direction of the arrow A of FIG. 1;

FIG. 5 is a fragmentary vertical sectional view taken on line 5—5 of FIG. 1;

FIG. 6 is a fragmentary top plan view illustrating the parted ends of the ring in their free state condition;

FIG. 7 is a bottom plan view corresponding to FIG. 6;

FIG. 8 is a fragmentary perspective view of the parted ends of the ring viewed from outside and slightly above the ring; and FIG. 9 is a fragmentary perspective view illustrating the parted ends of the ring as viewed from inside and slightly above the ring.

Referring in more detail to the drawings, FIG. 1 illustrates a piston ring 20 which embodies the principles of the invention in one exemplary presently preferred form for use as a top compression ring in diesel engine. As best seen by comparing FIGS. 1–4, ring 20 is of the type having a barrel face outer periphery 22, i.e., the outer peripheral face 22 of the ring has a uniform curvature about the radius R (FIG. 2). The cross sectional configuration of ring 20 is of the keystone type, i.e., the top and bottom sides 24 and 26 of the ring are tapered so as to converge towards one another inwardly of the ring. The inner periphery 31 of ring 20 extends parallel to the axis of the ring.

As best seen in FIGS. 3 and 4, the outer face 22 of the ring has a circumferentially extending groove defined by a root face 32 and upper and lower edge surfaces 34 and 36. This groove is filled in accordance with known techniques, e.g. plasma spraying with a hard wear-resistant material, such as molybdenum, to provide a band 38 extending circumferentially around the outer face of the ring. The body of the ring is made by conventional methods such as centrifugal casting, and comprises a ferrous metal such as ductile iron or steel.

In accordance with one feature of the present invention, the wear band 38 is offset axially of the ring such that its center is disposed slightly below the central plane P of the ring (FIG. 3), and the iron lands 40 and 42 which form the upper and lower boundaries respectively of band 38 are made unequal in width (measured axially of the ring). Radius R is centered on plane P. Thus, in one exemplary embodiment of the ring having a nominal outside diameter of 137.16 mm, top land 40 may have a width dimension of 0.76 to 0.89 mm, whereas the bottom land 42 may have a width dimension of only 0.10 to 0.23 mm. It has been found that both top land 40 and lower land 42 are narrow enough in such embodiment to minimize any scuffing tendency between the lands and the cylinder bore. The aforementioned barrel face 22 further reduces any scuffing by positioning the lands 40 and 42 away from the opposing cylinder wall (not shown).

In accordance with another feature of the present invention, ring 20 is provided with an angle-type overlap joint at the ring gap to reduce blow-by leakage in the engine. The joint design is a modified form of the type generally shown in FIGS. 6 and 7 of the aforementioned Raworth U.S. Pat. No. 615,902. Thus, as best seen in FIGS. 6–9, one of the parted ends of ring 20 is provided with a tongue 50 which protrudes circumferentially from a radially and axially extending end face 51 toward the other end of the ring. The other parted end of ring 20 is provided with a tongue-receiving, complementarily angled recess 54 (FIG. 8). When ring 20 is compressed to operating diameter, as when the same is disposed in operative position in its corresponding top compression ring groove of a piston and the piston is assembled into the associated cylinder bore of an engine, tongue 50 underlies and slidably overlaps the opposite parted end of the ring. This normally overlapped, operative condition is illustrated in FIGS. 1, 4 and 5.

The angle seal joint is made by a conventional milling operation which cuts away the material from the end of the ring to form tongue 50, the milling cut simultaneously producing the angled top surface 52 of tongue 50 (FIG. 9) as well as the radially and axially extending end surface 51. The upper end of surface 52 terminates at the circumferentially extending edge 56 which is located approximately in the middle of upper land 40 of the tongue-end of the ring. The lower, inward end of angle surface 52 terminates at an edge 58 extending circumferentially of the ring close to but radially outwardly of the inner edge 60 of the inner periphery 31 of the ring. The hard-facing band 38 extends all the way to the axially extending outer edge 62 of tongue 50, and the end face 64 of tongue 50 is disposed on a radial plane parallel to the axis of ring 20.

The recess 54 in the other parted end of ring 20 is likewise formed by a milling operation to produce the angled surface 70 and associated side face 72 of the recess 54 (FIG. 8). The outer upper edge 74 of surface 70, like edge 56, extends circumferentially into the middle of top land 40 (FIG. 8). The lower, radially inward edge 76 of surface 70 also extends circumferentially of the ring and is located substantially coextensively with edge 58 in the overlapped condition of the ring (FIG. 5). The end face 78 (FIGS. 6–8) of the recessed end of the ring extends essentially parallel to face 51 to which it is juxtaposed in the overlapped, operative condition to ring 20.

The provision of the larger width upper land 40 of ring 20 through which the angle seal joint breaks out at the outer periphery of the ring at edges 56 and 74 (FIG. 8) leaves an upper land extension 40a running along tongue 50 from the outer edge of face 51 to end face 64 (FIG. 7) and an upper land extension 40b running along the outer periphery of the recessed end of the ring between faces 72 and 78. Preferably, inner land 40a has an axial dimension ranging from substantially one to three times the axial dimension of land 40b. It is also preferred that land 40b (FIG. 8) be at least equal to or slightly greater in axial dimension than lower land 42 of ring 20. Surfaces 52,70 (FIGS. 5, 8 and 9) lie in planes at an acute angle (preferably 24°) with respect to plane P and extending essentially diagonally of the ring body cross section.

After the angle seal joint is milled in the parted ends of the ring 20, a plurality of such rings are fixtured on an arbor and plasma-spray coated with the hard, wear-resistant material. The spray-coated surfaces are then ground to expose lands 40,42 separated by the band 38. Edges 74 and 56 of tongues 40a, 40b are then located outside of the ring surface portion filled by the spray metal. Thus, when expanding force is applied to the sprayed rings to part the ends, the only area where chippage of hard metal 38 is apt to occur is at the edges 62 and 80. The effect of such chippage along the axial edges 62 and 80 is minimized or eliminated by a subsequent gap grinding operation. This is feasible because of the relatively large dimensional tolerances permissible in the free gap dimensions, which in turn allows metal removal from surfaces 64 and 72 (and coating edges 62 and 80) without exceeding gap tolerances. In prior attempts to utilize an angle-seal overlap joint in wear-coated rings where the edges 56 and 74 were disposed within the hard coating metal, the angle surfaces 70,52 could not be machined to remove chippage while maintaining minimum clearance conditions between surfaces 52 and 70 to control gas leakage through the overlapped gap. Typically, in the exemplary rings heretofore mentioned, the clearance between these overlapping surfaces is maintained between the limits of 0.00 to 0.13 mm.

It will be understood that the angle-type joint design per se is operative to seal in the direction from the top side of the ring to the bottom side, the top side normally being marked "UP" and with a "pip" mark 84 (FIG. 6) so as to be oriented in assembly in the direction of the cylinder combustion area. Thus, with the top side of ring 20 installed facing upwardly toward the top of the piston, sealing by the ring joint is in the upward-to-downward direction. It is also to be understood that upper land 40 is preferably made wider than the lower land 42 to allow the angle seal joint to break out in the land 40 while still leaving lands 40a and 40b of sufficient width to insure edge strength. Nevertheless, and although not presently preferred, the lower land 42 could be made equal in width to upper land 40 in appropriate circumstances. Although the invention has been described in conjunction with molybdenum-filled rings, the principles of the invention are equally applicable to rings having other wear-resistant materials filling the groove, such as chrome, ceramics or aluminum oxide.

In the foregoing description and the appended claims, directional terminology such as "top", "bottom", "upper" and "lower" is used by way of description and not by way of limitation with reference to the preferred and hereinabove described orientation of the ring relative to the associated piston in an application where the piston reciprocates vertically and the ring is used as an upper or compression seal.

The invention claimed is:

1. A piston ring comprising a parted annular metal body having axial side walls for seating in a ring groove and an outer peripheral surface, a groove extending entirely around said outer peripheral surface and defined in part by axially spaced lands disposed on said surface, a band of wear-resistant material in said groove for sealing engagement with a cylinder wall, said lands being respectively adjacent opposing axial edges of said band, and an overlapping joint construction at the parted ends of the ring comprising opposed planar surfaces extending essentially diagonally of the ring body and inclined at an acute angle relative to the plane of said ring, said surfaces terminating at said outer peripheral surface within one of said lands.

2. The piston ring set forth in claim 1 adapted to function as a compression ring for a piston in a reciprocating piston engine and further comprising indicia for indicating installation orientation in a piston groove such that said one of said lands is disposed in the direction of the cylinder firing area.

3. The piston ring set forth in claim 2 wherein said planar surfaces of said joint terminate at their radially inward edges in the said side wall remote from said one of said lands.

4. The piston ring set forth in claim 3 wherein said surfaces of said joint extend circumferentially from an associated end wall defining one radial face of the ring gaps to another associated end wall defining the other radial face of the gaps, said groove extending circumferentially completely around said peripheral surface and said band having axially extending end edges exposed at the split.

5. The piston ring of claim 1, 2 or 4 wherein said peripheral surface has a barrel face contour such that the maximum outside diameter of said ring falls within the outer wear surface of said metal band.

6. The piston ring of claim 1, 2 or 4 wherein said one of said lands is wider than the other of said lands.

7. The piston ring of claim 1, 2 or 4 wherein said ring has a keystone cross-sectional contour.

8. The piston ring of claim 5 wherein the center of the axial dimension of said band is offset from the central plane of said ring body toward the ring side wall more remote from said one of said lands.

9. A piston ring for a reciprocating piston internal combustion engine comprising a parted annular metal body having an outer peripheral surface, a band of wear-resistant material extending entirely around said outer peripheral surface and adapted for sealing engagement with a cylinder wall, said band having a dimension axially of said ring which is less than that of said outer peripheral surface and being offset axially from the plane of said ring such that said outer peripheral surface includes land areas of unequal axial dimension integral with said body and disposed entirely around axially opposite edges of said band, and an overlap joint construction at the parted ends of said ring comprising opposed planar surfaces extending diagonally of the ring cross section and terminating at said outer peripheral surface in the said land area of greater axial dimension.

* * * * *